UNITED STATES PATENT OFFICE.

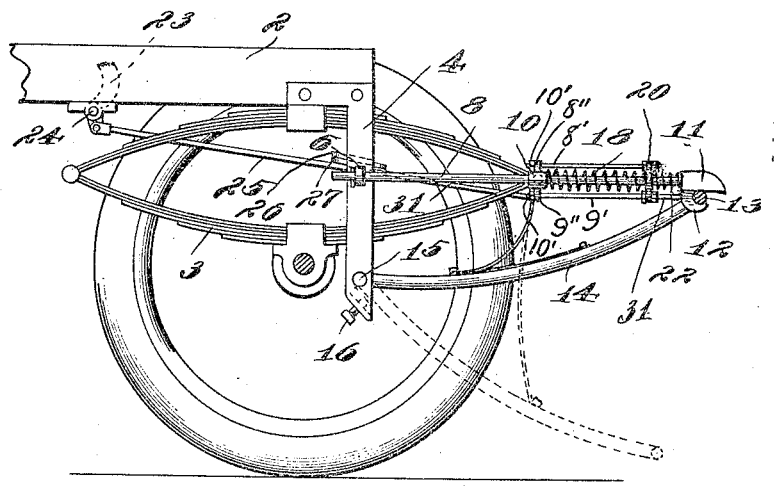

LARS C. MADSEN, OF CHICAGO, ILLINOIS.

AUTOMOBILE-FENDER.

1,178,169.   Specification of Letters Patent.   Patented Apr. 4, 1916.

Application filed October 28, 1909. Serial No. 525,194.

*To all whom it may concern:*

Be it known that I, LARS C. MADSEN, a citizen of the United States, residing at Chicago, in the county of Cook and State of Illinois, have invented certain new and useful Improvements in Automobile-Fenders, of which the following is a specification.

My invention relates to automobile parts and has particular reference to means for decreasing the dangers to pedestrians who accidentally get in the way of such vehicles.

The object of the invention is to provide a fender which is normally supported in an inoperative position clear of all road obstructions and which may be made to automatically fall into operative position when the machine strikes a person or object in its path and which may also be released by the operator of the vehicle when there is ample time to anticipate a collision.

With the above-named objects in view, my invention consists of the novel construction, combination and arrangement of parts hereinafter described in detail, illustrated in the accompanying drawing and particularly pointed out in the appended claim.

In the drawing—Figure 1 is a view in side elevation of a portion of the front of an automobile or other vehicle with my invention applied thereto. Fig. 2 is a plan view of the parts shown in Fig. 1.

In the several views 2 represents a portion of the frame of the vehicle. This frame is usually supported on springs 3. At the sides of the frame are hanging brackets 4 on which are eyes 5 and 6 which slidably support rods 7 and 8. On the forward ends of the springs 3 are secured slide-bearing blocks 9 and 10 which coöperate with the eyes 5 and 6 to support the rods 7 and 8 in horizontal positions. On the forward ends of the rods 7 and 8 the usual buffer 11 is supported, and this buffer is provided with a hook 12 near each of its ends. These hooks 12 normally support the forward edge of the fender, which edge is in the present instance a rod 13 bent twice at right angles to form the fender frame the parallel ends of which are pivoted to the supports 4, as shown at 15 in Fig. 1. In each of the hanging brackets 4 is a set screw 16 which has threaded engagement with an inclined bore in the lower end of the bracket. These set screws serve as stops limiting the downward movement of the fender by engaging the sides of the fender and supporting them forwardly of the fender's pivots 15. These set screws therefore determine the lowered or acting position of the fender, or, in other words, the height of the forward edge of the fender above ground when it is down. On the rod bent twice at right angles to form the front and sides of the fender, or frame, is usually secured a netting, but the particular details of fender construction are not material to the present invention which is designed to be applicable to a large variety of forms of fender.

The buffer 11 is cushioned by means of spiral springs 17 and 18, the inner ends of which bear against the bearing blocks 9 and 10 and outer ends of which bear against collars 19 and 20 which are mounted to move toward and from the blocks 9 and 10. The collars 19 and 20 are therefore loosely mounted on the rods 7 and 8. Springs 21 and 22 are arranged on the rods in the same manner as the springs 17 and 18, but between the collars and the buffer. The springs 21 and 22 are weaker than the springs 17 and 18, the latter serving as heavy shock absorbers while the former are designed to yield to comparatively light impact against the buffer and readily release the rod 13 of the fender when the bumper strikes an obstacle or person. When the resistance of the springs 21 and 22 has been overcome and the bumper has come into contact with the collars the heavier springs will then be made to serve the function of ordinary bumper springs. While the hooks 12 are shown far forwardly they can be arranged farther back with relation to the front edge of the bumper or to accommodate themselves to the length of fender used or the distance the bumper is arranged from the body or tonneau of the machine.

An upper guide-rod 8' and a lower guide-rod 9' are secured at their forward ends to the collars 19 and 20 above and below the rods 7 and 8, respectively. The rear ends of these guide-rods are slidably mounted in eyes or apertured lugs 8'' and 9'' on, respectively, the upper and lower side of each of the bearing-blocks 9 and 10 and are provided with heads or nuts 10' arranged on the rods in the rear of the respective eyes or lugs to prevent accidental disengagement of the guide-rods from said eyes or lugs. When the spiral springs 17 and 18 are compressed by the collars 19 and 20 the guide-rods 8′ and 9′ slide freely through the apertured lugs 8″ and 9″.

Provision is made for release of the fender into its lowered or operative position, through direct action of the operator by pushing rearwardly on a lever 23 which is pivoted at 24 to the bottom of the vehicle body. The lower or load-end of this lever is pivoted to one end of a rod 25, the opposite end of the latter being coupled with a pivot joint to the adjacent ends of a pair of levers 26 and 27 fulcrumed, respectively, at 28 and 29. The load ends of the latter levers are connected with the bumper 11 through connecting rods 30 and 31, pivoted to their respective connections. These lever connections with the bumper 11 also serve another purpose, in addition to that of positive control from the operator's seat, namely, to insure the release of the hooks 12 at both sides of the machine or ends of the bumper, even though the latter is pushed back at only one end instead of being struck near its middle portion so as to equalize the force. By reason of the lever connections comprising the levers 26 and 27 and the connecting rods 30 and 31, when one end of the bumper is forced back the other end will also be forced back to release its hook or jaw 12, thus insuring simultaneous release of both hooks no matter what portion of the bumper meets an obstruction. For instance, looking at Fig. 2, if the left hand end of the bumper 11 is forced back by direct contact with said end, its jaw or hook will, of course, be positively released and the opposite hook will also be released by the thrust movement of the connecting rod 30 being communicated to the lever 26, which, in turn, swings the lever 27 and imparts a pulling force upon the connecting rod 31 to also move back the right hand end of the bumper and release its hook 12.

By reason of the above-described improvement in fenders it is possible to let the fender when in operative position touch or almost touch the roadway and thus insure its catching a person falling in front of the vehicle, whereas where a fender is permanently held in operative position it must necessarily be raised high enough above the ground to prevent its catching in uneven spots in the road due to depressions or otherwise. The clearance thus necessarily allowed for fixed fenders very often permits the fender to pass over and crush the person it is designed to catch and thus do more harm than good, as where no fender is used at all there is a possibility of the body of the machine passing over the person without the wheels doing so. Usually the driver of an automobile has a few seconds of warning of an impending collision, sufficient to enable him to release the fender by means of the lever 23, whether this be a short one to be operated by the foot as shown, or extended upwardly within convenient reach of his hand.

Where provision is made for supporting the fender normally in the position herein shown, the construction of the fender may be made far more effective in that it may be made to hug the road; in other words, its construction may be aimed wholly to catching the person happening in the way.

Having thus described my invention, I claim as new and desire to secure by Letters Patent—

The combination with a self propelling vehicle provided with a buffer, of a fender pivoted at its rear to the front of said vehicle so that it may be swung up to the buffer to clear the path or lowered to catch objects in its path, means for normally supporting the forward portion of the fender in its raised position on said buffer, means whereby collision with said buffer automatically releases said fender into its lowered or operative position, means for adjusting its elevation in the latter position, and manual means for releasing the fender.

In testimony whereof I have hereunto set my hand in the presence of two subscribing witnesses.

LARS C. MADSEN.

Witnesses:
G. A. TAUBERSCHMIDT,
M. C. ALLEN.